United States Patent [19]

Ohba

[11] Patent Number: 5,691,861

[45] Date of Patent: Nov. 25, 1997

[54] ACTUATOR ARM ASSEMBLY HAVING SIDE WALL PROJECTION FOR CARRYING JUXTAPOSED HEAD WIRES

[75] Inventor: Koichiro Ohba, Kawasaki, Japan

[73] Assignee: Fujitsu Limited, Kawasaki, Japan

[21] Appl. No.: 625,162

[22] Filed: Apr. 1, 1996

[30] Foreign Application Priority Data

Jun. 15, 1995 [JP] Japan .................................. 7-148806

[51] Int. Cl.$^6$ ...................................................... G11B 5/48
[52] U.S. Cl. ...................................................... 360/104
[58] Field of Search ...................................... 360/104–106

[56] References Cited

U.S. PATENT DOCUMENTS 5,161,077 11/1992 Jabbari ..................................... 360/106
5,418,666 5/1995 Mihara ..................................... 360/106

FOREIGN PATENT DOCUMENTS

A5266451 10/1993 Japan .

*Primary Examiner*—A. J. Heinz
*Attorney, Agent, or Firm*—Greer, Burns, Crain,Ltd.

[57] ABSTRACT

An actuator arm assembly includes an actuator arm rotatably mounted on a base and having a first surface and a second surface, a first suspension fixed at a base end portion thereof to the first surface of the actuator arm at a front end portion thereof, a first head mounted on a front end portion of the first suspension, a second suspension fixed at a base end portion thereof to the second surface of the actuator arm at the front end portion thereof, and a second head mounted on a front end portion of the second suspension. The actuator arm assembly further includes a first lead wire bundle connected to the first head, a second lead wire bundle connected to the second head, and a projection formed integrally with the actuator arm so as to project from a side surface of the actuator arm in a direction substantially parallel to the first and second surfaces. The first and second lead wire bundles are juxtaposed in the direction substantially parallel to the first and second surfaces.

5 Claims, 11 Drawing Sheets

5,691,861

ACTUATOR ARM ASSEMBLY HAVING SIDE WALL PROJECTION FOR CARRYING JUXTAPOSED HEAD WIRES

BACKGROUND OF THE INVENTION

1. Field of the Invention

The present invention relates to an actuator arm assembly for a disk drive.

2. Description of the Related Art

In a recent magnetic disk drive as a kind of external storage device for a computer, it has been desired to reduce the size, increase the storage capacity, and reduce the power consumption of the disk drive. To increase the storage capacity, an increase in recording density of a magnetic disk is required and the number of magnetic disks mounted in the disk drive is increasing.

In a magnetic disk drive for a computer, a contact start and stop (CSS) system is generally adopted as the relation between a head and a disk. In this system, the head is kept flying a microscopic height from the disk during rotation of the disk owing to the balance between a flying force generated by air flow due to high-speed rotation of the disk and a pressing force of a suspension for pressing the head on the disk. When the rotation of the disk is stopped, the head is moved to a contactable zone on the disk and next comes into contact with the disk at the contactable zone. In the rest condition of the disk, the head is kept in contact with the disk.

Conventionally, terminals of a transducer formed integrally with a magnetic head are connected through a pair of lead wires to a printed wiring board mounted in a magnetic disk drive, so as to supply a writing data signal to the transducer or transmit a data signal read by the transducer to the printed wiring board. More specifically, the pair of lead wires are assembled to a single lead wire bundle by forming. The lead wire bundle for an up head and a similar lead wire bundle for a down head are placed on a side surface of an actuator arm, and are fixed to the side surface of the actuator arm by an adhesive.

With a reduction in size and an increase in storage capacity of the magnetic disk drive, the number of disks mounted in the magnetic disk drive is increased and accordingly the wall thickness of each actuator arm becomes increasingly smaller. If the pair of lead wire bundles are placed on the side surface of such an actuator arm having a small wall thickness and are fixed thereto by an adhesive, the adhesive may project beyond the wall thickness of the actuator arm, and a projecting part of the adhesive may come into contact with the magnetic disk, causing head crash.

SUMMARY OF THE INVENTION

It is therefore an object of the present invention to provide an actuator arm assembly which can fix the lead wire bundles to the actuator arm without projection of the lead wire bundles beyond the wall thickness of the arm even when the wall thickness of the arm is small.

In accordance with an aspect of the present invention, there is provided an actuator arm assembly for a disk drive having a base, comprising an actuator arm rotatably mounted on the base and having a first surface and a second surface; a first suspension fixed at a base end portion thereof to the first surface of the actuator arm at a front end portion thereof; a first head mounted on a front end portion of the first suspension; a second suspension fixed at a base end portion thereof to the second surface of the actuator arm at the front end portion thereof; a second head mounted on a front end portion of the second suspension; a first lead wire bundle connected to the first head; a second lead wire bundle connected to the second head; and a projection formed integrally with the actuator arm so as to project from a side surface of the actuator arm in a direction substantially parallel to the first surface and the second surface; the first and second lead wire bundles being juxtaposed in the direction substantially parallel to the first and second surfaces and fixed to the projection by an adhesive.

In accordance with another aspect of the present invention, there is provided an actuator arm assembly for a disk drive having a base, comprising an actuator arm rotatably mounted on the base and having a first surface and a second surface; a first suspension fixed at a base end portion thereof to the first surface of the actuator arm at a front end portion thereof; a first head mounted on a front end portion of the first suspension; a second suspension fixed at a base end portion thereof to the second surface of the actuator arm at the front end portion thereof; a second head mounted on a front end portion of the second suspension; a first lead wire bundle connected to the first head; a second lead wire bundle connected to the second head; and a projection formed integrally with the actuator arm so as to project from a side surface of the actuator arm, the projection having a groove extending in a direction substantially parallel to the first and second surface of the actuator arm; the first and second lead wire bundles being juxtaposed in the direction substantially parallel to the first and second surfaces and fixedly engaged in the groove of the projection.

According to the present invention, the first and second lead wire bundles are juxtaposed in the direction substantially parallel to the first surface and the second surface of the actuator arm and are fixed to the projection projecting from the side surface of the actuator arm by the adhesive. Accordingly, the lead wire bundles can be easily fixed to the actuator arm without projection beyond the wall thickness of the actuator arm.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
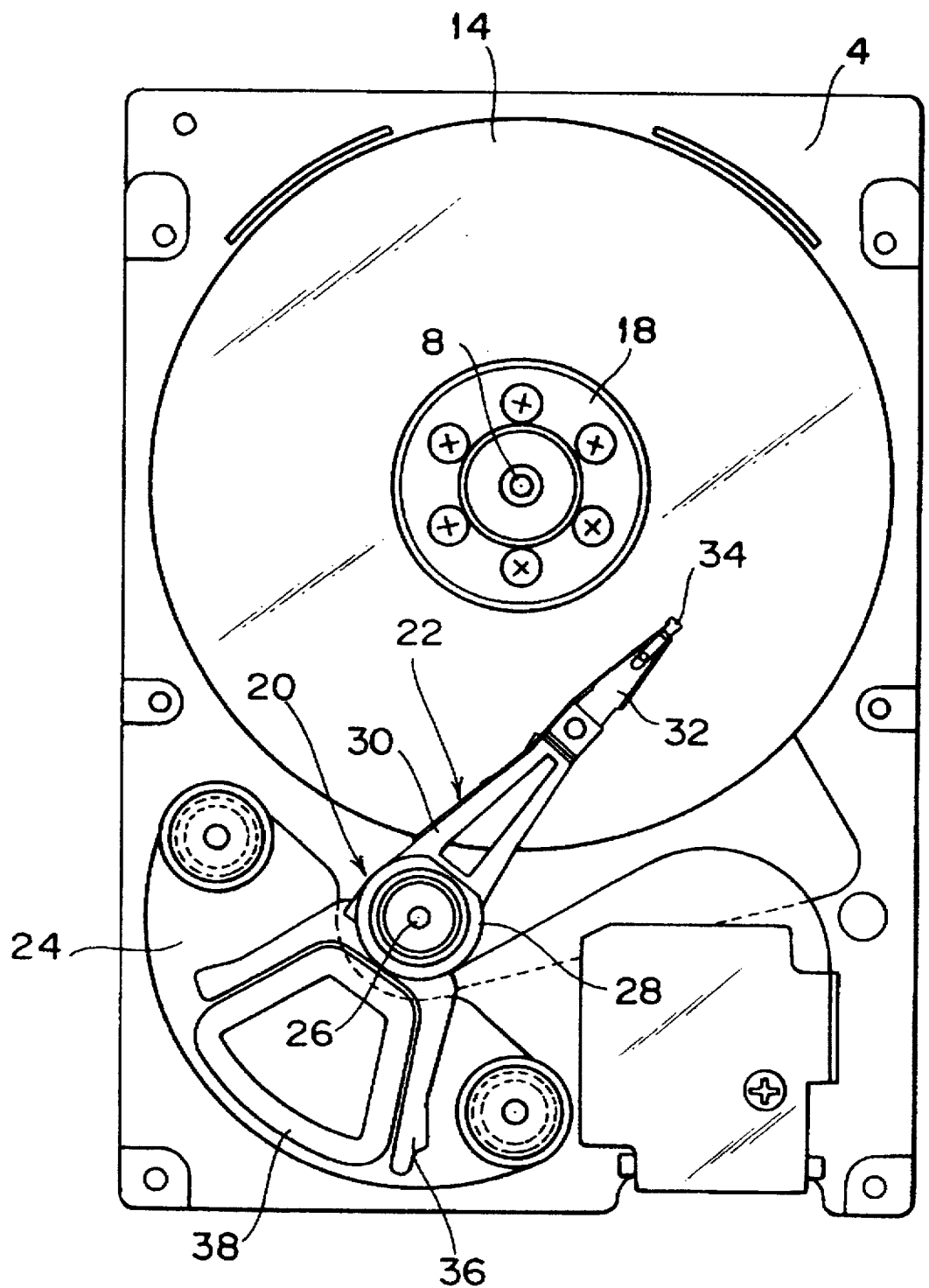
FIG. 1 is a schematic plan view of a magnetic disk drive.

A magnetic disk drive including an actuator arm assembly according to the present invention will now be described in brief with reference to FIGS. 1 and 2. Reference numeral 2 denotes a housing (disk enclosure) composed of a base 4 and a cover 6. A shaft 8 is fixed to the base 4, and a spindle hub 12 is rotatably mounted on the shaft 8 so as to be rotated about the shaft 8 by an inner hub motor 10.

A plurality of magnetic disks 14 and spacers 16 are alternately stacked and mounted on the spindle hub 12. That is, the plurality of magnetic disks 14 are regularly spaced apart from each other by the spacers 16 and are fixedly mounted on the spindle hub 12 by securing a disk clamp 18 to the spindle hub 12 by screws. Reference numeral 20 denotes a rotary actuator composed of an actuator arm assembly 22 and a magnetic circuit 24. The actuator arm assembly 22 includes an actuator block 28 rotatably mounted on a shaft 26 fixed to the base 4.

The actuator block 28 is integrally formed with a plurality of actuator arms 30 extending in one direction. A suspension 32 is fixed at its base end portion to the front end portion of each actuator arm 30, and a head 34 is mounted on the front end portion of each suspension 32. The actuator block 28 is further integrally formed with a coil supporting member 36 extending in a direction opposite to the direction of extension of the actuator arms 30, and a flat coil 38 is mounted on the coil supporting member 36.

Figure 2:
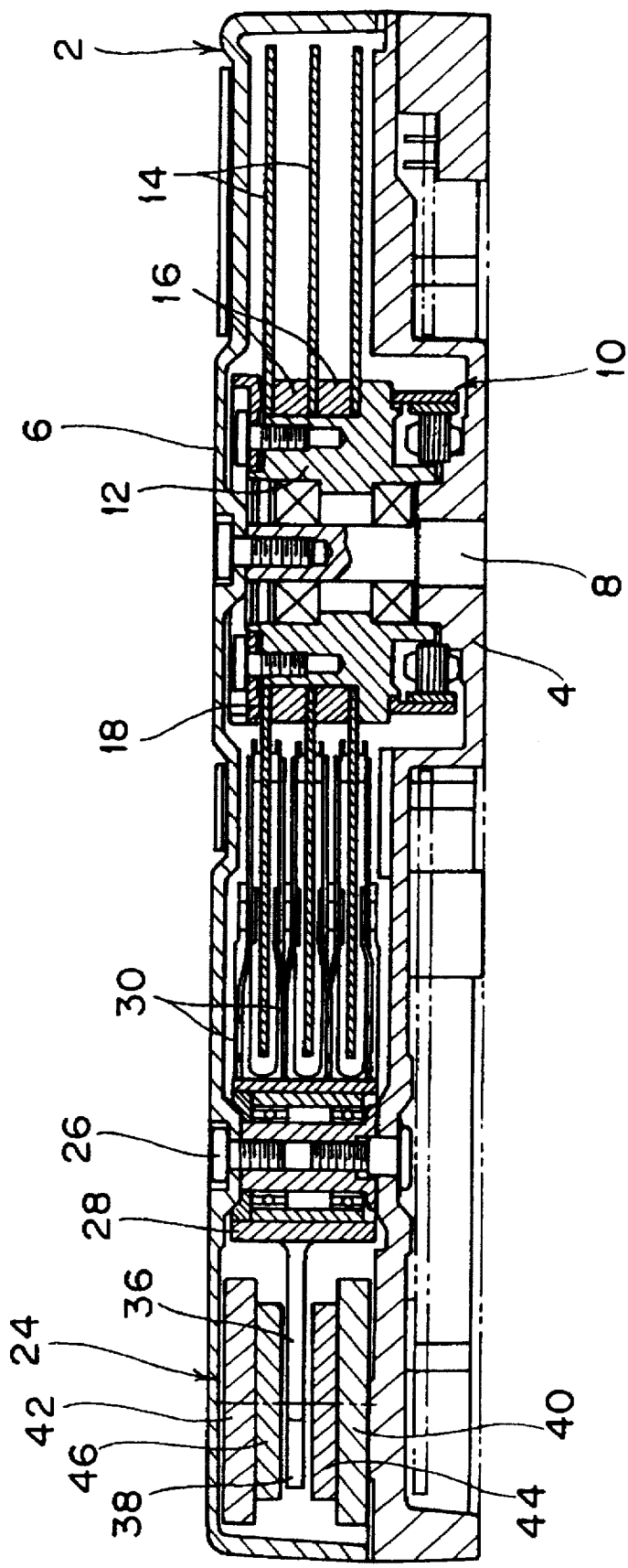
FIG. 2 is a schematic sectional view of the magnetic disk drive.

As shown in FIG. 2, the magnetic circuit 24 includes a lower yoke 40, an upper yoke 42, a lower magnet 44 mounted on the lower yoke 40, and an upper magnet 46 mounted on the upper yoke 42. The flat coil 38 is inserted in a gap defined by the lower magnet 44 and the upper magnet 46.

Figure 4:
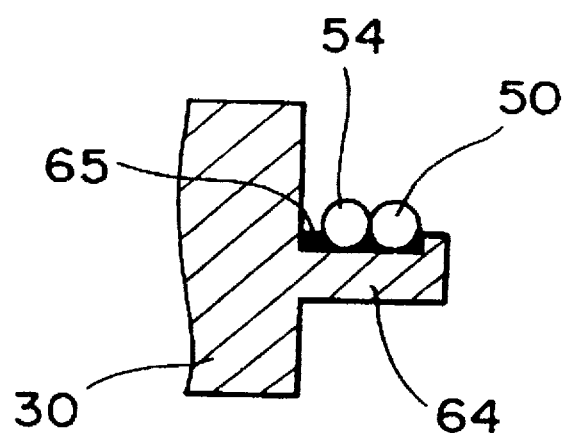
FIG. 4 is an enlarged sectional view of a fixing portion of an actuator arm to which a pair of lead wire bundles are fixed according to the first preferred embodiment.
Figure 5:
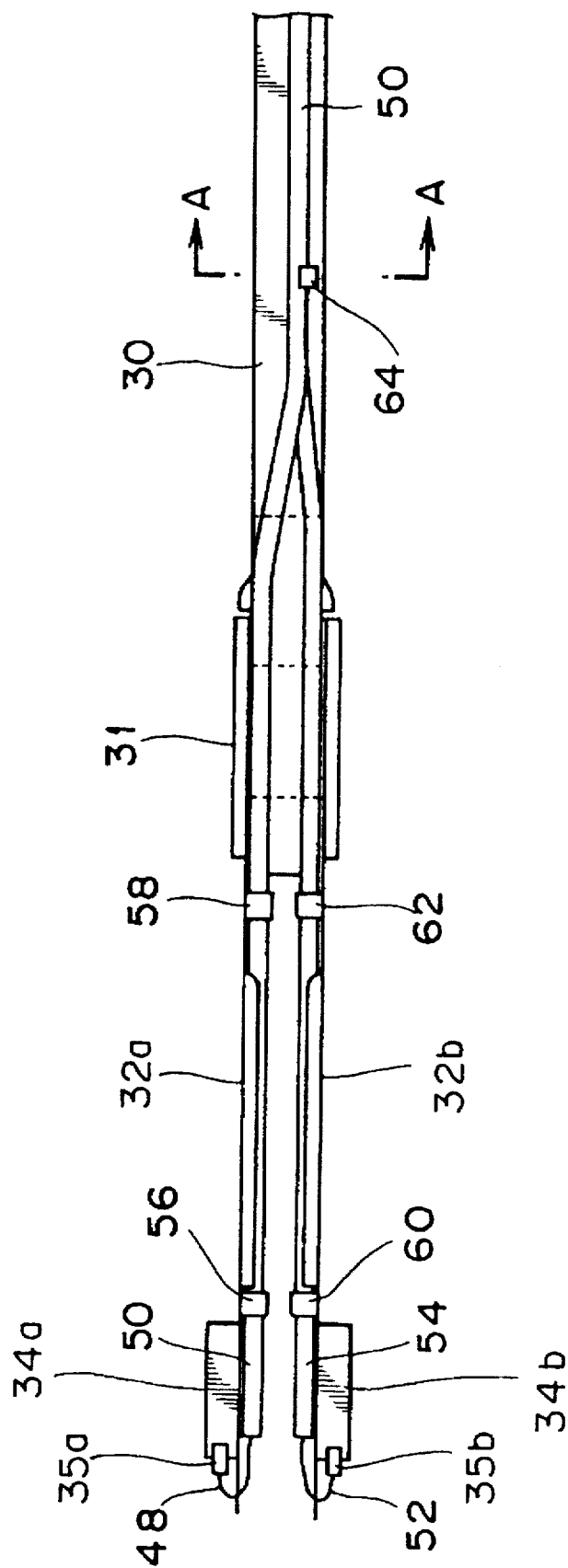
FIG. 5 is a side view of suspensions fixed to the actuator arm in the first preferred embodiment.

The structure of an actuator arm assembly according to a first preferred embodiment of the present invention will now be described with reference to FIGS. 3 to 5. As best shown in FIG. 5, an upper suspension 32a and a lower suspension 32b are riveted at their base end portions to the front end portion of the actuator arm 30 by using a spacer 31. An up head 34a is mounted on the front end portion of the upper suspension 32a, and a down head 34b is mounted on the front end portion of the lower suspension 32b.

A pair of lead wires 48 are connected to a transducer 35a of the up head 34a. The lead wires 48 are assembled to a single lead wire bundle 50 by forming. That is, the lead wires 48 are inserted in a plastic tube in a mutually insulated condition. The lead wire bundle 50 is fixed to the upper suspension 32a by bending two fixing portions 56 and 58 integral with the upper suspension 32a.

Similarly, a pair of lead wires 52 are connected to a transducer 35b of the down head 34b. The lead wires 52 are assembled to a single lead wire bundle 54 by forming. The lead wire bundle 54 is fixed to the lower suspension 32b by bending two fixing portions 60 and 62 integral with the lower suspension 32b. The upper and lower suspensions 32a and 32b are formed of stainless steel, for example.

Figure 3:
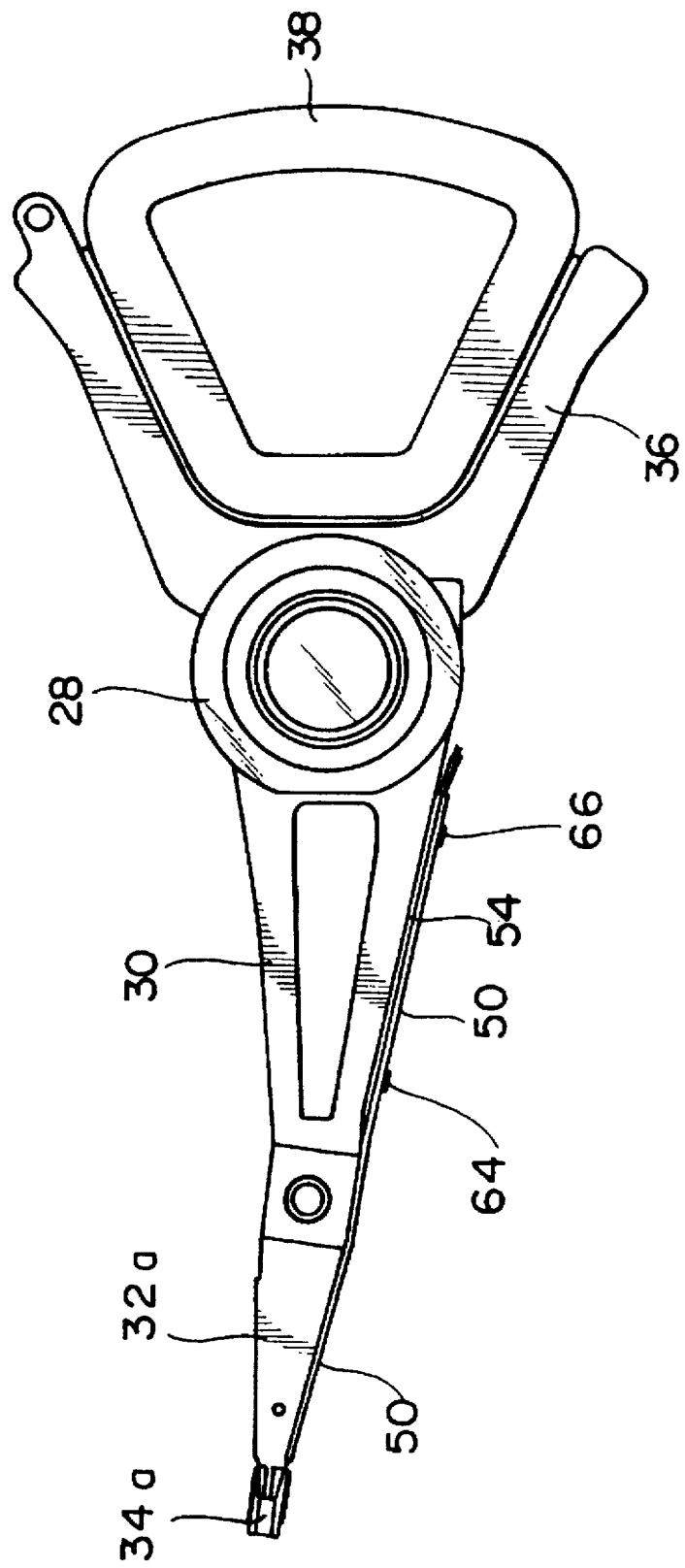
FIG. 3 is a plan view of a first preferred embodiment of the present invention.

As shown in FIG. 3, a pair of projections 64 and 66 are formed integrally on one side surface of the actuator arm 30 by aluminum die casting. That is, as shown in FIG. 4 which is a cross section taken along the line A—A in FIG. 5, each of the projections 64 and 66 projects in a direction substantially parallel to an upper surface and a lower surface of the actuator arm 30. As shown in FIG. 4, the lead wire bundles 50 and 54 are placed side by side, e.g. juxtaposed, on the projections 64 and 66, and are fixed to the projections 64 and 66 by an adhesive 65.

According to this preferred embodiment, the lead wire bundles 50 and 54 are fixed to the projections 64 and 66 by the adhesive 65. Accordingly, the lead wire bundles 50 and 54 are juxtaposed in the direction substantially parallel to the upper surface and the lower surface of the actuator arm 30 and fixed to the projections 64 and 66 of the actuator arm 30 by the adhesive 65. Therefore, there is no possibility that the adhesive 65 may project beyond the wall thickness of the actuator arm 30, so that it is possible to prevent head crash due to dust caused by aging of a projecting part of the adhesive.

Figure 6:
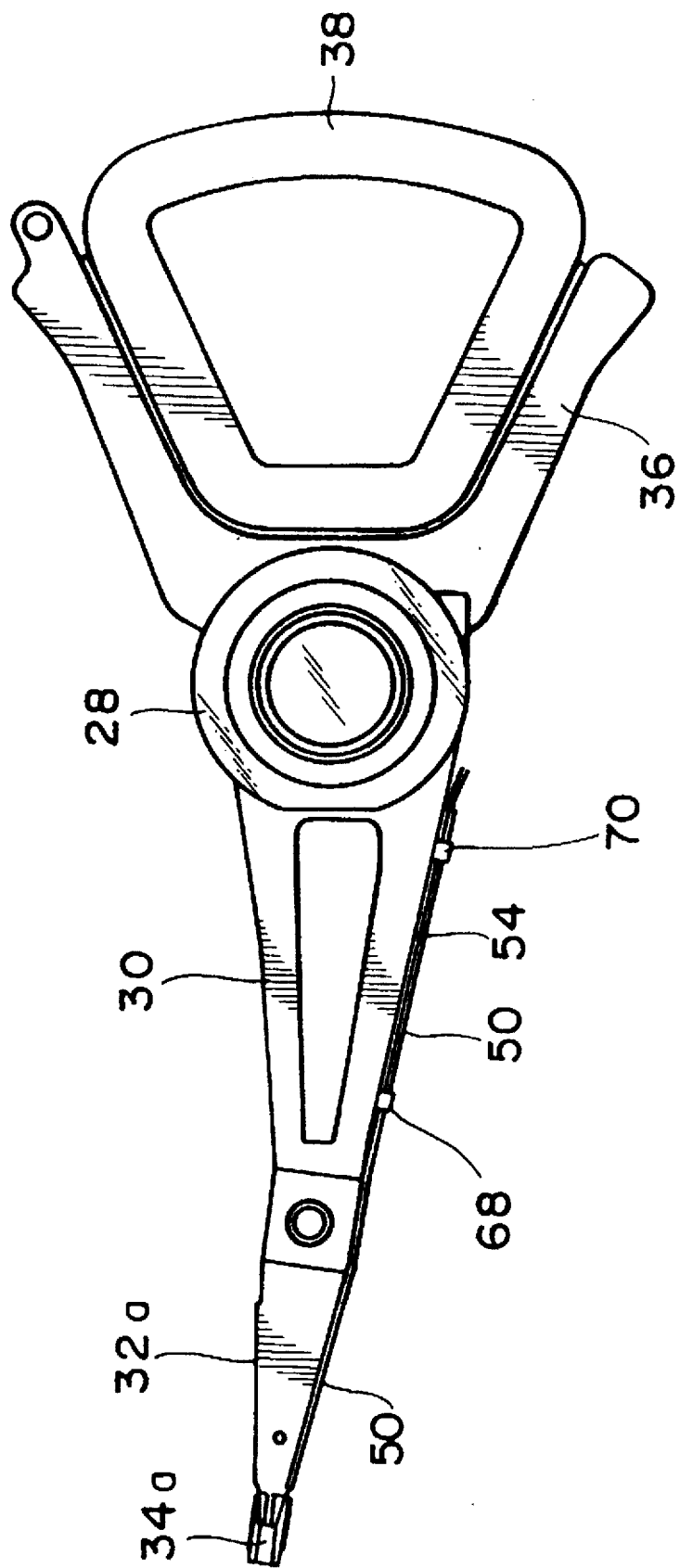
FIG. 6 is a plan view of a second preferred embodiment of the present invention.
Figure 7:
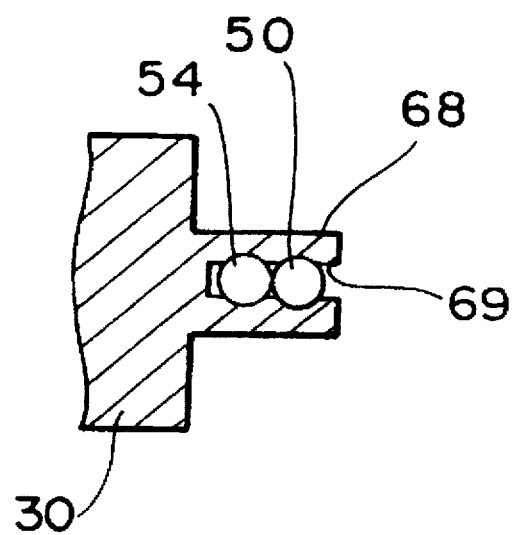
FIG. 7 is an enlarged sectional view of a fixing portion of an actuator arm to which the lead wire bundles are fixed according to the second preferred embodiment.

Referring to FIG. 6, there is shown a plan view of a second preferred embodiment of the present invention. In this preferred embodiment, a pair of projections 68 and 70 for fixing the lead wire bundles 50 and 54 are formed integrally on one side surface of the actuator arm 30. As shown in FIG. 7 which is an enlarged sectional view illustrating the structure of the projection 68, the projection 68 has a groove 69 extending in a direction substantially parallel to the upper surface and the lower surface of the actuator arm 30. Although not shown, the projection 70 also has a similar groove 69.

As shown in FIG. 7, the lead wire bundles 50 and 54 are firmly engaged in the grooves 69 of the projections 68 and 70. Thus, the lead wire bundles 50 and 54 are fixed to the actuator arm 30. According to this preferred embodiment, the lead wire bundles 50 and 54 can be fixed to the actuator arm 30 only by engaging the lead wire bundles 50 and 54 into the grooves 69 of the projections 68 and 70 without the use of an adhesive. Accordingly, the fixing of the lead wire bundles 50 and 54 to the actuator arm 30 can be easily realized. Although not shown, a method of fixing the lead wire bundles 50 and 54 to the upper and lower suspensions 32a and 32b is similar to that in the first preferred embodiment as described with reference to FIG. 5.

Figure 8:
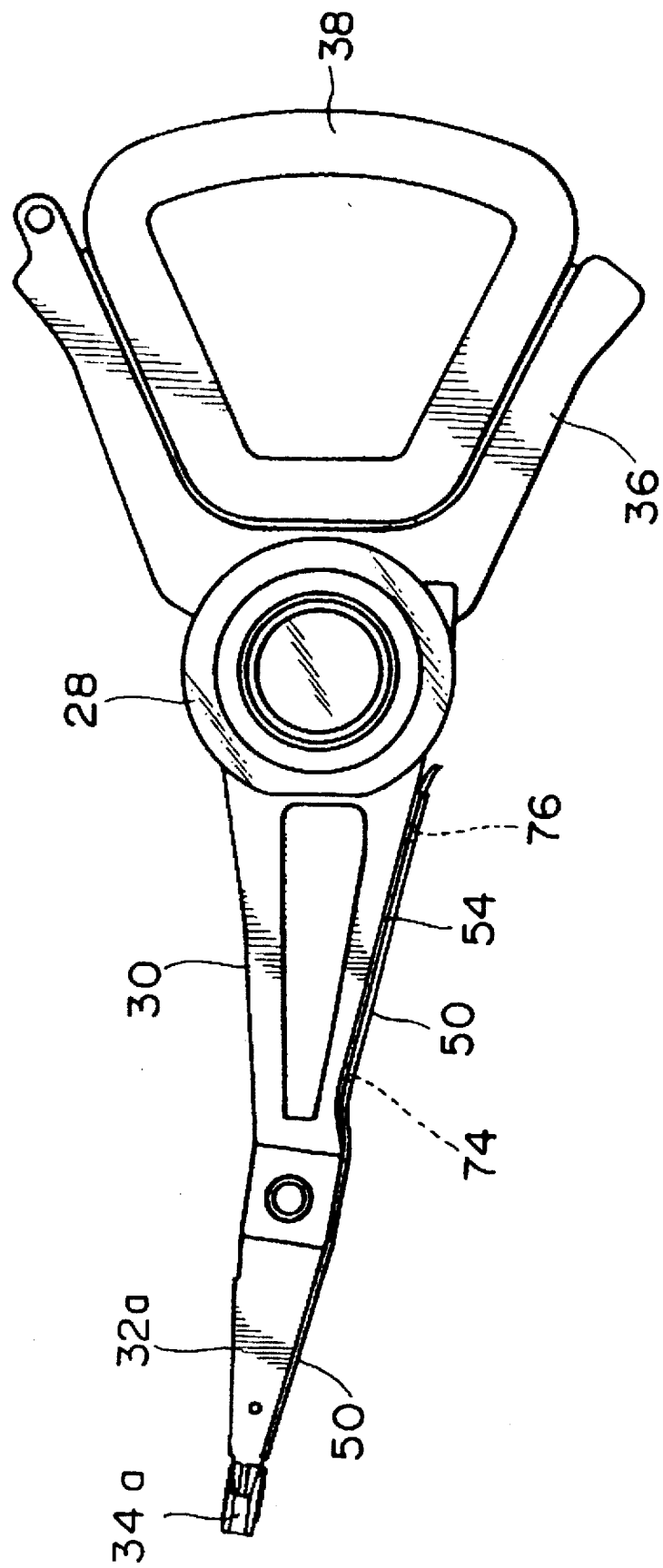
FIG. 8 is a plan view of a third preferred embodiment of the present invention.
Figure 9:
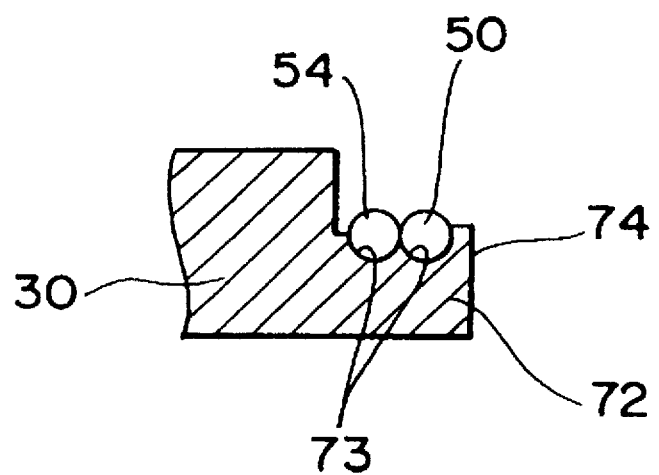
FIG. 9 is an enlarged sectional view of a fixing portion of an actuator arm to which the lead wire bundles are fixed according to the third preferred embodiment.

Referring to FIG. 8, there is shown a plan view of a third preferred embodiment of the present invention. In this preferred embodiment, the upper surface of the actuator arm 30 is partially cut away in the vicinity of one side surface thereof along the one side surface to form a thin-walled portion 72 extending along the one side surface of the actuator arm 30 as shown in FIG. 9. Further, a pair of fixing portions 74 and 76 are formed integrally on the thin-walled portion 72 so as to have a wall thickness larger than that of the thin-walled portion 72. Each of the fixing portions 74 and 76 is formed with a pair of parallel grooves 73 extending in a longitudinal direction of the actuator arm 30. The lead wire bundles 50 and 54 are firmly engaged in the grooves 73 of the fixing portions 74 and 76. Thus, the lead wire bundles 50 and 54 are fixed to the actuator arm 30. Although not shown, a method of fixing the lead wire bundles 50 and 54 to the upper and lower suspensions 32a and 32b is similar to that in the first preferred embodiment as described with reference to FIG. 5.

Figure 10:
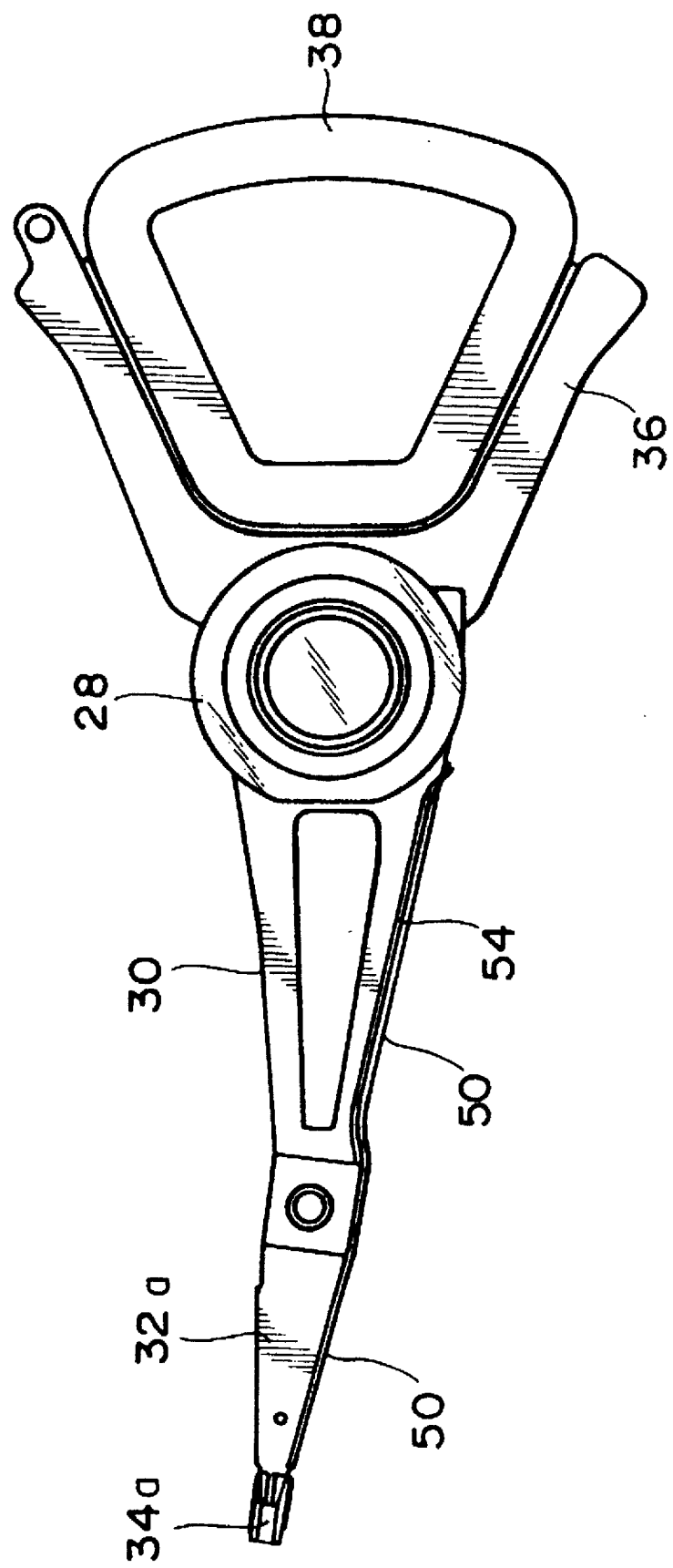
FIG. 10 is a plan view of a fourth preferred embodiment of the present invention.
Figure 11:
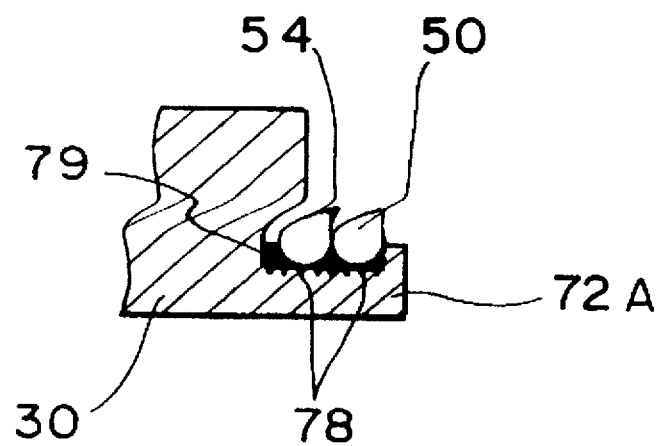
FIG. 11 is an enlarged sectional view of a fixing portion of an actuator arm to which the lead wire bundles are fixed according to the fourth preferred embodiment.

Referring to FIG. 10, there is shown a plan view of a fourth preferred embodiment of the present invention. In this preferred embodiment, the upper surface of the actuator arm 30 is partially cut away in the vicinity of one side surface thereof along the one side surface to form a thin-walled portion 72A extending along the one side surface of the actuator arm 30 as shown in FIG. 11 as similar to the third preferred embodiment mentioned above. A plurality of slits 78 are formed on the upper surface of the thin-walled portion 72A. The lead wire bundles 50 and 54 are juxtaposed on the upper surface of the thin-walled portion 72A, and are fixed thereto by an adhesive 79. According to this preferred embodiment, the plural slits 78 are formed on the upper surface of the thin-walled portion 72A, and the lead wire bundles 50 and 54 are fixed to the upper surface of the thin-walled portion 72A by the adhesive 79. Accordingly, the adhesive 79 enters the slits 78 to firmly fix the lead wire bundles 50 and 54 to the thin-walled portion 72A of the actuator arm 30.

According to the present invention as described above, the lead wire bundles can be fixed to the actuator arm so as to be juxtaposed in a direction substantially parallel to the upper surface and the lower surface of the actuator arm, thereby allowing a reduction in wall thickness of the actuator arm. Accordingly, the actuator arm can be reduced in weight, and a magnetic disk drive having a very small size and a large storage capacity can be provided.

What is claimed is:

1. An actuator arm assembly for a disk drive having a base, comprising:

an actuator arm rotatably mounted on said base, said actuator arm having a first surface and a second surface;

a first suspension fixed at a base end portion thereof to said first surface of said actuator arm at a front end portion thereof;

a first head mounted on a front end portion of said first suspension;

a second suspension fixed at a base end portion thereof to said second surface of said actuator arm at the front end portion thereof;

a second head mounted on a front end portion of said second suspension;

a first lead wire bundle connected to said first head;

a second lead wire bundle connected to said second head;

a plurality of projections formed integrally with said actuator arm so as to project from a side surface of said actuator arm in a direction substantially parallel to said first surface and said second surface, said projections being spaced apart from each other and disposed in a single plane extending in a longitudinal direction of said actuator arm; and said first and second lead wire bundles being juxtaposed in said direction substantially parallel to said first and second surfaces and fixed to said projections by an adhesive.

2. An actuator arm assembly for a disk drive having a base, comprising:

an actuator arm rotatably mounted on said base, said actuator arm having a first surface and a second surface, said actuator arm having one side surface partially cut away to form a thin-walled portion extending along said one side surface, said thin-walled portion having a projection formed along an edge thereof extending in a longitudinal direction of said actuator arm;

a first suspension fixed at a base end portion thereof to said first surface of said actuator arm at a front end portion thereof;

a first head mounted on a front end portion of said first suspension;

a second suspension fixed at a base end portion thereof to said second surface of said actuator arm at the front end portion thereof;

a second head mounted on a front end portion of said second suspension;

a first lead wire bundle connected to said first head;

a second lead wire bundle connected to said second head; and said first and second lead wire bundles being juxtaposed and bonded to said thin walled portion.

3. An actuator arm assembly for a disk drive according to claim 2, wherein said thin-walled portion has at least two fixing portions each having a pair of grooves extending in a longitudinal direction of said actuator arm, and said first and second lead wire bundles are fixedly engaged in said pair of grooves of each fixing portion.

4. An actuator arm assembly for a disk drive according to claim 2, wherein said thin-walled portion has a surface formed with a plurality of slits, and said first and second lead wire bundles are bonded on said surface.

5. An actuator arm assembly for a disk drive according to claim 2, wherein said thin-walled portion has a plurality of projections spaced apart from each other and disposed in a single plane extending in said longitudinal direction of said actuator arm.

* * * * *